US010867575B2

(12) United States Patent
Lee (10) Patent No.: US 10,867,575 B2
(45) Date of Patent: Dec. 15, 2020

(54) IMAGE DISPLAY APPARATUS AND OPERATING METHOD THEREOF

(71) Applicant: SAMSUNG ELECTRONICS CO., LTD., Suwon-si (KR)

(72) Inventor: Hyun-soo Lee, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 15/689,042

(22) Filed: Aug. 29, 2017

(65) Prior Publication Data
US 2018/0061363 A1 Mar. 1, 2018

(30) Foreign Application Priority Data
Aug. 31, 2016 (KR) .................. 10-2016-0111691

(51) Int. Cl.
*H04N 5/445* (2011.01)
*G06T 3/40* (2006.01)
*G09G 5/02* (2006.01)
*G09G 5/00* (2006.01)
*H04N 13/30* (2018.01)
(Continued)

(52) U.S. Cl.
CPC ............. *G09G 5/003* (2013.01); *G06F 3/147* (2013.01); *G06T 3/40* (2013.01); *G09G 5/02* (2013.01); *H04N 5/23238* (2013.01); *H04N 13/30* (2018.05); *H04N 21/4316* (2013.01); *H04N 21/47* (2013.01); *H04N 5/45* (2013.01)

(58) Field of Classification Search
None
See application file for complete search history.

(56) References Cited

U.S. PATENT DOCUMENTS 8,744,216 B2   6/2014   Arai et al.
9,098,737 B2   8/2015   Sanaullah et al.
(Continued)

FOREIGN PATENT DOCUMENTS

CN   1985266 A    6/2007
CN   102395994 A  3/2012
(Continued)

OTHER PUBLICATIONS

Communication dated Dec. 13, 2017 by the International Searching Authority in counterpart International Patent Application No. PCT/KR2017/009123. (PCT/ISA/210, PCT/ISA/220 and PCT/ISA/237).
(Continued)

*Primary Examiner* — Aaron M Richer
(74) *Attorney, Agent, or Firm* — Sughrue Mion, PLLC (57) ABSTRACT

An image display apparatus and a method thereof. The image display apparatus includes: a display; a processor; a memory including a first buffer and a second buffer; and at least one program stored in the memory and executed by the processor. The instructions included in the program cause the processor to perform graphics processing on a first image, convert an attribute of the graphics-processed first image, generate an on screen display (OSD) image and control the memory to store the OSD image in the second buffer, perform image quality processing on the first image of which the attribute is converted, and control the display to display the image-quality-processed first image and the OSD image.

21 Claims, 6 Drawing Sheets

(51) Int. Cl.
*H04N 21/47* (2011.01)
*H04N 21/431* (2011.01)
*G06F 3/147* (2006.01)
*H04N 5/232* (2006.01)
*H04N 5/45* (2011.01)

(56) References Cited

U.S. PATENT DOCUMENTS

| | | | |
|---|---|---|---|
| 2001/0045988 A1* | 11/2001 | Yamauchi | G06T 1/60 348/273 |
| 2004/0001091 A1 | 1/2004 | Kressin | |
| 2004/0169724 A1* | 9/2004 | Ekpar | G06T 3/0062 348/36 |
| 2005/0206659 A1* | 9/2005 | Cutler | G03B 37/00 345/660 |
| 2005/0225677 A1 | 10/2005 | Choi | |
| 2006/0062487 A1* | 3/2006 | Ouchi | G06T 3/4038 382/284 |
| 2008/0118180 A1 | 5/2008 | Kamiya et al. | |
| 2008/0123960 A1* | 5/2008 | Kim | G06K 9/38 382/173 |
| 2008/0181312 A1 | 7/2008 | Kimura | |
| 2009/0109241 A1 | 4/2009 | Tsujimoto | |
| 2010/0194993 A1 | 8/2010 | Kuno | |
| 2010/0231687 A1 | 9/2010 | Amory et al. | |
| 2011/0273474 A1 | 11/2011 | Iwayama | |
| 2012/0307151 A1 | 12/2012 | Hunleth | |
| 2014/0002471 A1 | 1/2014 | Yeo et al. | |
| 2015/0091939 A1 | 4/2015 | Suzuki et al. | |
| 2016/0379415 A1* | 12/2016 | Espeset | G06T 15/04 345/633 |

FOREIGN PATENT DOCUMENTS

| | | |
|---|---|---|
| CN | 103530033 A | 1/2014 |
| CN | 103795976 A | 5/2014 |
| CN | 105809729 A | 7/2016 |
| KR | 101530826 B1 | 6/2015 |
| KR | 1020160021706 A | 2/2016 |
| RU | 2011 142 603 A | 4/2013 |
| WO | 2006022630 A1 | 3/2006 |
| WO | 2012/057907 A1 | 5/2012 |

OTHER PUBLICATIONS

Communication dated Jan. 29, 2018 by the European Patent Office in counterpart European Patent Application No. 17187546.1.
Communication dated Sep. 27, 2019, issued by the State Intellectual Property Office of P.R. China in counterpart Chinese Application No. 201710777153.0.
Communication dated Oct. 3, 2019, issued by the Russian Patent Office in counterpart Russian Application No. 2019109035.
Communication dated Feb. 21, 2020, issued by the Russian Patent Office in counterpart Russian Application No. 2019109035.
Communication dated Aug. 3, 2020, issued by the State Intellectual Property Office of P.R. China in counterpart Chinese Patent Application No. 201710777153.0.

* cited by examiner

IMAGE DISPLAY APPARATUS AND OPERATING METHOD THEREOF

CROSS-REFERENCE TO RELATED APPLICATION

This application claims priority from Korean Patent Application No. 10-2016-0111691, filed on Aug. 31, 2016, in the Korean Intellectual Property Office, the disclosure of which is incorporated herein by reference in its entirety.

BACKGROUND

1. Field

Apparatuses and methods consistent with aspects of one or more exemplary embodiments broadly relate to an image display apparatus and an operating method thereof, and more particularly, to an image display apparatus for displaying a 360° image and an operating method thereof.

2. Description of the Related Art

An image display apparatus is an apparatus having a function of displaying an image which a user can view. The user may view a broadcast program through the image display apparatus. The image display apparatus displays a broadcast program selected by the user from among broadcast signals broadcast from broadcasting stations. Recently, there has been a trend whereby broadcasting technique has been changing from analog to digital broadcasting.

The digital broadcasting technique indicates a broadcasting technique of broadcasting digital images and voice signals. Compared with analog broadcasting, the digital broadcasting technique has less data loss due to robustness to external noise, is better in terms of error correction, has a higher resolution, and provides a clearer image. In addition, unlike the analog broadcasting technique, the digital broadcasting technique may provide an interactive service.

In addition, recently, smart televisions (TVs) for providing various pieces of content besides having a digital broadcasting function have been provided. The smart TVs aim to analyze and provide what users want even without a user's operation. That is, the smart TVs provide what the user's want without the user's manual selection.

The image display apparatus performs image quality processing on video content but does not perform image quality processing on graphics. Accordingly, a graphics-processed 360° image may be displayed without image quality processing having been performed thereon.

SUMMARY

According to aspects of exemplary embodiments, an image display apparatus performs image quality processing on an image and an operating method thereof, are provided.

Additional aspects of exemplary embodiments will be set forth in part in the description which follows and, in part, will be apparent from the description, or may be learned by practice of exemplary embodiments.

According to an aspect of an exemplary embodiment, an image display apparatus includes: a display; a processor; a memory including a first buffer and a second buffer; and at least one program stored in the memory and executed by the processor, wherein the at least one program includes instructions which when executed by the processor cause the processor to perform graphics processing on a first image convert an attribute of the graphics-processed first image, generate an on screen display (OSD) image, control the memory to store the OSD image in the second buffer, perform image quality processing on the first image of which the attribute is converted, and control the display to display the image-quality-processed first image and the OSD image.

According to an aspect of another exemplary embodiment, a method of displaying an image is provided. The method includes: performing graphics processing on the first image; converting an attribute of the graphics-processed first image; generating an on screen display (OSD) image and storing the OSD image in a second buffer; performing image quality processing on the first image of which the attribute is converted; and displaying the image-quality-processed first image and the OSD image on a display.

BRIEF DESCRIPTION OF THE DRAWINGS

These and/or other aspects will become apparent and more readily appreciated from the following description of exemplary embodiments, taken in conjunction with the accompanying drawings. Understanding that these drawings depict only exemplary embodiments and are not therefore to be considered to be limiting of the scope of the disclosure, the principles herein are described and explained with additional specificity and detail through the use of the accompanying drawings, in which.

DETAILED DESCRIPTION OF EXEMPLARY EMBODIMENTS

The terms used in the present disclosure will be schematically described, and then, exemplary embodiments will be described in detail.

The terms used in this present disclosure are those general terms currently widely used in the art, but the terms may vary according to the intention of those of ordinary skill in the art, precedents, or new technology in the art. Also, specified terms may be selected by the applicant, and in this case, the detailed meaning thereof will be provided in the detailed description. Thus, the terms used in the present disclosure should be understood not as simple names but based on the meaning of the terms and the overall description of exemplary embodiments.

Throughout the specification, it will also be understood that when a component "includes" an element, unless there is another opposite description thereto, it should be understood that the component does not exclude another element but may further include another element. In addition, terms such as " . . . unit", " . . . module", or the like refer to units that perform at least one function or operation, and the units may be implemented as hardware or software or as a combination of hardware and software.

Reference will now be made in detail to exemplary embodiments, examples of which are illustrated in the accompanying drawings. In the drawings, parts irrelevant to the description are omitted to clearly describe exemplary embodiments, and like reference numerals denote analogous elements throughout exemplary embodiments. In this regard, exemplary embodiments may have different forms and should not be construed as being limited to the descriptions set forth herein. Accordingly, exemplary embodiments are merely described below, by referring to the figures, to explain aspects.

In exemplary embodiments, the term "user" indicates a person who controls a function or operation of an image display apparatus by using a control device and may include a viewer, a manager, or an installation engineer.

As used herein, the term "and/or" includes any and all combinations of one or more of the associated listed items. Expressions such as "at least one of," when preceding a list of elements, modify the entire list of elements and do not modify the individual elements of the list.

Figure 1:
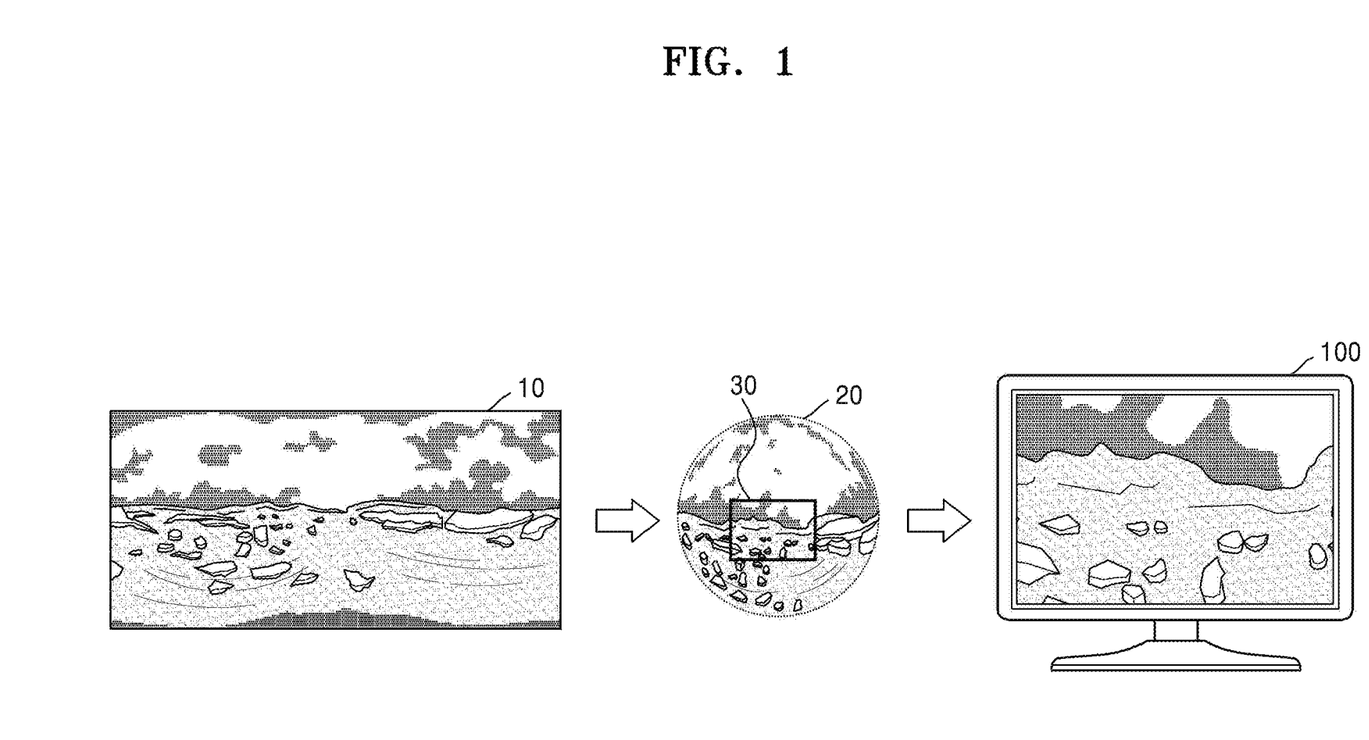
FIG. 1 is a view illustrating an image display apparatus for displaying a 360° image, according to an exemplary embodiment.

FIG. 1 is a view illustrating an image display apparatus for displaying a 360° image, according to an exemplary embodiment.

Referring to FIG. 1, the image display apparatus 100 may display a 360° image. According to an exemplary embodiment, the 360° image may have an angle of view of 360°. For example, the 360° image may be generated based on a plurality of images captured in a 360° direction by using a camera. Herein, the captured plurality of images may be mapped to a sphere, and points of contact of the mapped images may be connected (stitched) to generate a sphere-format 360° image. In addition, the sphere-format 360° image may be converted into a planar-format 360° image 10 as shown in FIG. 1 so that the planar-format 360° image 10 may be transmitted to another device or stored. In this case, according to an exemplary embodiment, the planar-format 360° image 10 may be distorted.

According to an exemplary embodiment, the image display apparatus 100 may receive the planar-format 360° image 10 from an external device, or store the planar-format 360° image 10. In addition, the image display apparatus 100 may decode the planar-format 360° image 10 that has been received from the external device or is stored.

The image display apparatus 100 may perform graphics processing on the decoded planar-format 360° image 10. For example, the image display apparatus 100 may convert the planar-format 360° image 10 into a sphere-format 360° image 20. The image display apparatus 100 may map the planar-format 360° image 10 to a sphere to generate the sphere-format 360° image 20. The image display apparatus 100 may select a partial region 30 based on a user's operating input (e.g., angle movement or zoom input) on the sphere-format 360° image 20. In addition, according to an exemplary embodiment, the image display apparatus 100 may correct distortion of the selected region 30, convert the corrected image into an image having a rectangular view, and display the converted image on a display of the image display apparatus 100, as shown in FIG. 1.

According to an exemplary embodiment, the image display apparatus 100 may perform image quality processing on an image corresponding to the selected region 30 and display the image-quality-processed image on the display. This will be described in detail further below with reference to FIGS. 2 through 6.

According to an exemplary embodiment, the image display apparatus 100 may be a television (TV), but this is merely an exemplary embodiment, and the image display apparatus 100 may be implemented by an electronic device including a display. For example, the image display apparatus 100 may be implemented by various electronic devices such as a cellular phone, a tablet personal computer (PC), a digital camera, a camcorder, a laptop computer, a desktop PC, an e-book terminal, a digital broadcast terminal, a personal digital assistant (PDA), a portable multimedia player (PMP), a navigation machine, an MP3 player, and a wearable device. In particular, exemplary embodiments may be readily implemented in display apparatuses having a large display, such as a TV, but are not limited thereto. In addition, the image display apparatus 100 may be a stationary or mobile type and may be a digital broadcast receiver capable of receiving a digital broadcast signal.

The image display apparatus 100 may be implemented by not only a flat display apparatus but also a curved display apparatus having a curvature or a flexible display apparatus whose curvature is adjustable. Examples of an output resolution of the image display apparatus 100 may include high definition (HD), full HD, ultra HD, and a higher resolution than ultra HD.

Figure 2:
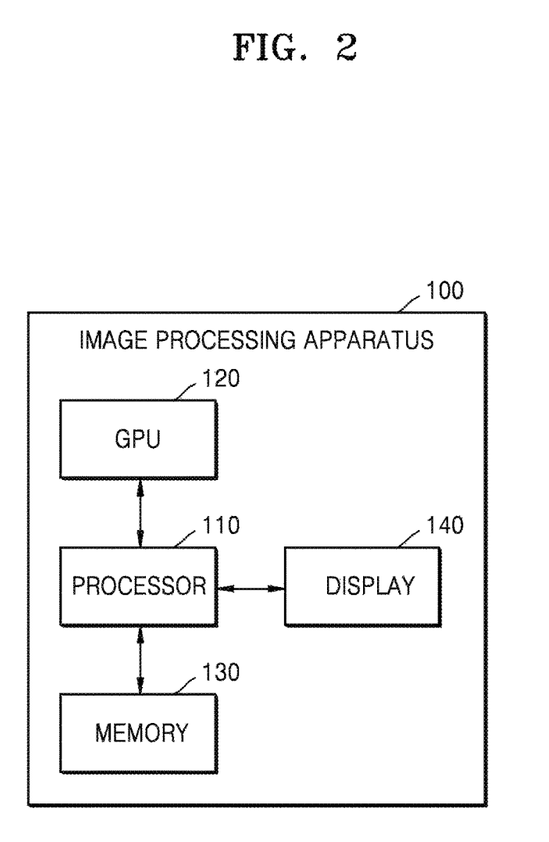
FIG. 2 is a block diagram illustrating an image display apparatus according to an exemplary embodiment.

FIG. 2 is a block diagram illustrating an image display apparatus according to an exemplary embodiment.

Referring to FIG. 2, the image display apparatus 100 may include a processor 110, a graphics processing unit (GPU) 120, a memory 130, and a display 140.

The display 140 generates a driving signal by converting an image signal, a data signal, an on screen display (OSD) signal, a control signal, or the like. The display 140 may be implemented by a plasma display panel (PDP), a liquid crystal display (LCD), an organic light-emitting diode (OLED), a flexible display, or the like and may also be implemented by a three-dimensional (3D) display. In addition, the display 140 may be used as an input device in addition to being an output device by being configured with a touch screen.

According to an exemplary embodiment, the display 140 may display a first image and an OSD image, and the first image may be a 360° image. In addition, the 360° image displayed on the display 140 may be an image-quality-processed 360° image.

According to an exemplary embodiment, the processor 110 may execute at least one program stored in the memory 130. The processor 110 may include a single core, dual cores, triple cores, quadruple cores, or a multiple number of cores thereof. In addition, the processor 110 may include a plurality of processors. For example, the processor 110 may be implemented by a main processor (not shown) and a sub-processor (not shown) operating in a sleep mode.

According to an exemplary embodiment, the memory 130 may store various data, programs, or applications for operating and controlling the image display apparatus 100.

In addition, the program stored in the memory 130 may include one or more instructions. The program (one or more instructions) or application stored in the memory 130 may be executed by the processor 110.

According to an exemplary embodiment, the memory 130 may include a first buffer and a second buffer. Herein, the first buffer may be a buffer in which a first image (e.g., 360° image) is stored, and the second buffer may be a buffer in which an OSD image is stored. In addition, the first buffer may be a video buffer, and the second buffer may be a graphics buffer, wherein an image having a YUV color space may be stored in the first buffer, and an image having an RGB format may be stored in the second buffer. However, exemplary embodiments are not limited thereto and this is provided by way of an example only.

According to an exemplary embodiment, the processor 110 may control one or more instructions included in one or more programs stored in the memory 130 such that the one or more instructions perform graphics processing on a first image and convert an attribute of the graphics-processed first image, store the graphics processed first image of which the attribute is converted in the first buffer, and generate an OSD image and store the generated OSD image in the second buffer. For example, the first image may be an 360° image.

For example, the GPU 120 may perform a process of converting a decoded planar-format 360° image into a sphere-format 360° image, correcting distortion of an image in a partial region of the sphere-format 360° image, and converting the distortion-corrected image into an image having a rectangular view.

In addition, the GPU 120 may generate an OSD image. According to an exemplary embodiment, the OSD image is a screen image including various objects, such as an icon, an image, and a text, for various kinds of information and may include, for example, a user interface (UI) screen image, various menu screen images, and a widget screen image. However, exemplary embodiments are not limited thereto and this is provided by way of an example only.

The GPU 120 may compute attribute values such as a coordinate value, a shape, a size, and a color by which each object is to be displayed according to a layout of a screen image by using a user input that is input into the image display apparatus 100. In addition, the GPU 120 may generate various layouts of screen images including objects based on the computed attribute values.

According to an exemplary embodiment, the processor 110 may convert an attribute of the graphics-processed first image. For example, the first image may be a 360° image, and the processor 110 may control a color space of a graphics-processed 360° image to be converted. For example, the processor 110 may control the color space of a graphics-processed 360° image such that the color space is converted from an RGB color space into a YUV color space. The 360° image of which the color space has been converted may be stored in the first buffer. The processor 110 may control the graphics-processed first image of which the attribute is converted stored in the first buffer. In addition, the processor 110 may perform image quality processing on the graphics-processed first image which is stored in the first buffer. For example, the processor 110 may control the 360° image stored in the first buffer such that image quality processing is performed on the 360° image. For example, the image quality processing on the 360° image may include a process of optimizing a cubic effect and a color sense of an image by improving a contrast ratio and color of the 360° image, a process of optimizing image quality by performing gamma correction on the 360° image, a process of enhancing sharpness of the 360° image by performing sharpness processing on an edge portion included in the 360° image, a process of alleviating a jagging phenomenon appearing in an image by adjusting resolution of the 360° image or performing anti-aliasing on the 360° image, and the like. The jagging phenomenon is a phenomenon appearing in a raster method of displaying a line with dots and indicates a phenomenon in which an outline is not smooth and becomes rough having a stepped shape and loses edge linearity, which occurs in an object such as a diagonal, a circle, or a curve.

In addition, the processor 110 may control the display 140 such that the image-quality-processed first image and the OSD image are displayed on the display 140.

Figure 3:
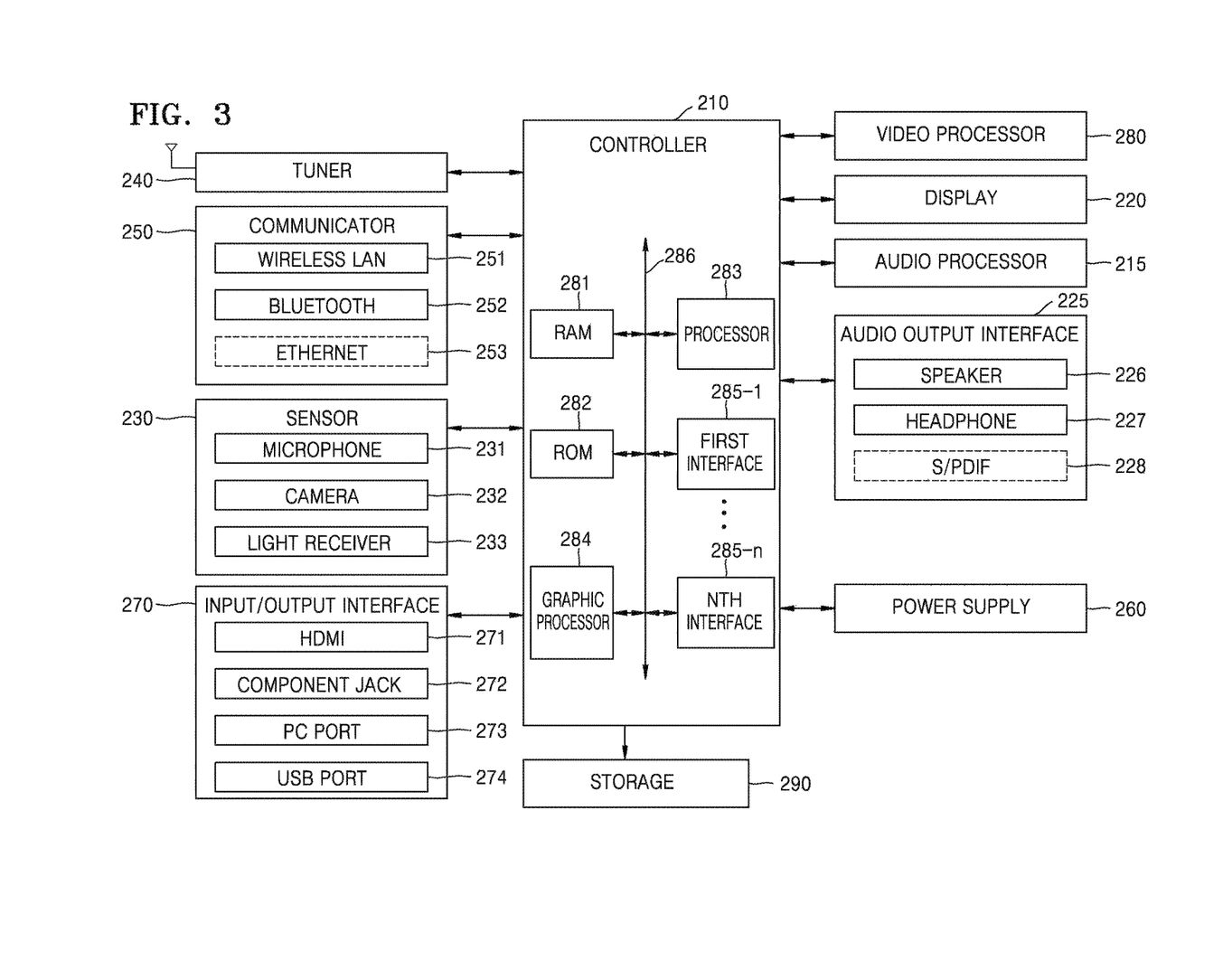
FIG. 3 is a block diagram illustrating an image display apparatus according to another exemplary embodiment.

FIG. 3 is a block diagram illustrating an image display apparatus according to another exemplary embodiment. The image display apparatus depicted in FIG. 3 may be an exemplary embodiment of the image display apparatus 100 depicted in FIG. 1.

Referring to FIG. 3, the image display apparatus may include a controller 210, a display 220, a sensor 230, a video processor 280, an audio processor 215, an audio output interface 225, a power supply 260, a tuner 240, a communicator 250, an input/output (I/O) interface 270, and a storage 290 such as a memory.

The processor 110, the GPU 120, the memory 130, and the display 140 of FIG. 2 may correspond to the controller 210, a graphical processor 284, the storage 290, and the display 220 of FIG. 3, respectively, according to an exemplary embodiment. The same description as given with reference to FIG. 2 is omitted herein.

The communicator 250 may transmit and receive data or a signal to and from an external device or server under control of the controller. The controller 210 may transmit/receive content to/from the external device connected through the communicator 250, download an application from the external device, or perform web browsing through the communicator 250. The communicator 250 may transmit and receive data or a signal by at least one scheme of a wireless local area network (WLAN) (e.g., Wi-Fi), Bluetooth, and wired Ethernet in correspondence with the performance and structure of the image display apparatus. In addition the communicator 250 may include a combination of a wireless local area network (WLAN) interface 251, a Bluetooth interface 252, and a wired Ethernet interface 253. The communicator 250 may further include other short-range communication interfaces (e.g., a near field communication (NFC) interface, not shown) and a Bluetooth low energy (BLE) communication interface (not shown), in addition to the Bluetooth interface 252.

The tuner 240 may tune and select only a frequency of a channel which the image display apparatus desires to receive from among a number of frequency components through amplification, mixing, resonance, and the like of a broadcast signal received in a wired or wireless manner. The broadcast signal includes audio, video and additional information (e.g., electronic program guide (EPG)).

The tuner 240 may receive a broadcast signal in a frequency band corresponding to a channel number according to a user input (e.g., a control signal received from a control device, examples of the control signal are a channel number input, a channel up/down input, and a channel input on an EPG screen image).

The tuner 240 may receive broadcast signals from various sources such as terrestrial broadcasting stations, cable broadcasting stations, satellite broadcasting stations, and Internet broadcasting stations. The tuner 240 may receive broadcast signals from sources such as analog broadcasting stations or digital broadcasting stations. A broadcast signal received through the tuner 240 is decoded (e.g., audio decoding, video decoding, or additional information decoding) and separated into audio, video, and/or additional information. The separated audio, video, and/or additional information may be stored in the image display apparatus under control of the controller 210.

The tuner 240 of the image display apparatus may be single or plural in number. The tuner 240 may be implemented as all-in-one with the image display apparatus or implemented as a separate device (e.g., a set-top box (not shown) having a tuner) electrically connected to the image display apparatus or as a tuner (not shown) connected to the I/O interface 270.

The video processor 280 processes video data received by the image display apparatus. The video processor 280 may include a video decoder configured to decode the video data. In addition, the video processor 280 may perform various types of image processing, such as scaling, noise filtering, frame rate conversion, and resolution conversion.

According to an exemplary embodiment, the video processor 280 may decode a planar-format 360° image. According to an exemplary embodiment, the planar-format 360° image may be represented by a YUV color space. In addition, according to an exemplary embodiment, the video processor 280 may further include an image quality processor (not shown) configured to perform image quality processing on a general image or a 360° image. For example, the image quality processor may optimize a cubic effect and a color sense of an image by improving a contrast ratio and color of the 360° image or optimize image quality by performing gamma correction on the 360° image. Alternatively, the image quality processor may enhance sharpness of the 360° image by performing sharpness processing on an edge portion included in the 360° image. In addition, the image quality processor may perform a process of alleviating a jagging phenomenon. The jagging phenomenon is a phenomenon appearing in a raster method of displaying a line with dots and indicates a phenomenon in which an outline is not smooth and becomes rough having a stepped shape and loses edge linearity, which occurs in an object such as a diagonal, a circle, or a curve. The image quality processor may alleviate a jagging phenomenon appearing in an image by adjusting the resolution of the 360° image or performing anti-aliasing by which the brightness of a boundary surface is adjusted to generate an intermediate tone such that the 360° image is smoothly viewed.

The display 220 displays video included in a broadcast signal received through the tuner 240 on a screen under control of the controller 210. In addition, the display 220 may display content (e.g., video) input through the communicator 250 or the I/O interface 270. The display 220 may display an image stored in the storage 290 under control of the controller 210. In addition, the display 220 may display a voice user interface (UI) (e.g., including a voice command guide) for performing a voice recognition task corresponding to voice recognition or a motion UI (e.g., including a user motion guide for motion recognition) for performing a motion recognition task corresponding to motion recognition.

The audio processor 215 processes audio data. The audio processor 215 may perform various types of processing, such as decoding, amplification, and noise filtering, on the audio data. The audio processor 215 may include a plurality of audio processing modules to process audio data corresponding to a plurality of pieces of content.

The audio output interface 225 outputs audio included in a broadcast signal received through the tuner 240, under control of the controller 210. The audio output interface 225 may output audio (e.g., a voice or sound) input through the communicator 250 or the I/O interface 270. In addition, the audio output interface 225 may output audio stored in the storage 290, under control of the controller 210. The audio output interface 225 may include at least one of a speaker 226, a headphone output terminal 227, and a Sony/Philips digital interface (S/PDIF) output terminal 228. The audio output interface 225 may include a combination of the speaker 226, the headphone output terminal 227, and the S/PDIF output terminal 228.

The power supply 260 supplies power input from an external power source to the internal components 210 to 290 of the image display apparatus, under control of the controller 210. Alternatively, the power supply 260 may supply power input from one or more batteries (not shown) located inside the image display apparatus to the internal components 210 to 290, under control of the controller 210.

The sensor 230 senses a voice of the user, an image of the user, or an interaction of the user, according to an exemplary embodiment.

For example, a microphone 231 receives a voice uttered by the user. The microphone 231 may convert the received voice into an electrical signal and output the converted electrical signal to the controller 210. The user's voice may include, for example, a voice corresponding to a menu or function of the image display apparatus. The microphone 231 may be implemented by being integrated with or separated from the image display apparatus. The separated microphone 231 may be electrically connected to the image display apparatus through the communicator 250 or the I/O interface 270.

A camera 232 may receive an image (e.g., continuous frames) corresponding to a motion of the user, including a gesture, within a camera recognition range. The motion of the user may include, for example, a motion of a partial body part of the user, such as the face, expression, a hand, a fist, or a finger of the user, or a motion of a part of the user. The camera 232 may convert a received image into an electrical signal and output the electrical signal to the controller 210, under control of the controller 210.

The controller 210 may select a menu to be displayed on the image display apparatus or perform a control corresponding to a motion recognition result, by using a recognition result of a received motion. For example, the control may include channel tuning, volume adjustment, an indicator movement, or a cursor movement.

An optical receiver 233 receives an optical signal (including a control signal) from an external control device through an optical window (not shown) on a bezel of the display 220. The optical receiver 233 may receive an optical signal corresponding to a user input (e.g., a touch, a push, a touch gesture, a voice, or a motion) from the external control device. The control signal may be extracted from the received optical signal under control of the controller 210.

The I/O interface 270 receives video (e.g., a moving picture), audio (e.g., a voice or music), and additional information (e.g., an EPG), and the like from the outside of the image display apparatus under control of the controller 210. The I/O interface 270 may include one of a high definition multimedia interface (HDMI) port 271, a component jack 272, a PC port 273, and a universal serial bus (USB) port 274. The I/O interface 270 may include a combination of the HDMI port 271, the component jack 272, the PC port 273, and the USB port 274, according to an exemplary embodiment.

It will be easily understood by those of ordinary skill in the art that a configuration and operation of the I/O interface 270 may be implemented in various way according to exemplary embodiments.

The controller 210 controls the general operation of the image display apparatus and a signal flow between the internal components 210 to 290 of the image display apparatus and processes data. If an input of the user exists, or a previously set and stored condition is satisfied, the controller

210 may execute an operating system (OS) and various applications stored in the storage 290.

The controller 210 may include a random access memory (RAM) 281 used to store a signal or data input from outside of the image display apparatus (external to the image display apparatus) or used as a storage region corresponding to various operations performed by the image display apparatus, a read-only memory (ROM) 282 in which a control program for controlling the image display apparatus is stored, and a processor 283.

The processor 283 may include a GPU (not shown) for processing graphics corresponding to video. The processor 283 may be implemented by a system on chip (SoC) in which a core (not shown) and the GPU are integrated.

First to nth interfaces 285-1 to 285-n are connected to the various components described above, according to an exemplary embodiment. One of the first to nth interfaces 285-1 to 285-n may be a network interface connected to an external device via a network.

The RAM 281, the ROM 282, the processor 283, the graphic processor 284, and the first to nth interfaces 285-1 to 285-n may be connected to each other via an internal bus 286.

In an exemplary embodiment, the phrase "controller of an image display apparatus" may include the processor 283, the ROM 282, and the RAM 281.

The storage 290 may store various data, programs, or applications for operating and controlling the image display apparatus under control of the controller 210. The storage 290 may store signals or data input/output in correspondence with operations of the video processor 280, the display 220, the audio processor 215, the audio output interface 225, the power supply 260, the tuner 240, the communicator 250, the sensor 230, and the I/O interface 270. The storage 290 may store control programs for controlling the image display apparatus and the controller 210, applications initially provided from a manufacturer or downloaded from the outside, graphical user interfaces (GUIs) related to the applications, objects (e.g., image text, icons, and buttons) for providing the GUIs, user information, documents, databases (DBs), or related data.

According to an exemplary embodiment, the term "storage" includes the storage 290, the ROM 282 of the controller 210, the RAM 281 of the controller 210, or a memory card (e.g., a micro secure digital (SD) card or a USB memory, not shown) mounted in the image display apparatus. In addition, the storage 290 may include a nonvolatile memory, a volatile memory, a hard disk drive (HDD), or a solid state drive (SSD).

The storage 290 may include a broadcast reception module, a channel control module, a volume control module, a communication control module, a voice recognition module, a motion recognition module, an optical reception module, a display control module, an audio control module, an external input control module, a power control module, a module for controlling power of an external device connected in a wireless manner (e.g., Bluetooth), a voice DB, or a motion DB, which are not shown. The modules and DBs (not shown) of the storage 290 may be implemented in a software format to perform a broadcast reception control function, a channel control function, a volume control function, a communication control function, a voice recognition function, a motion recognition function, an optical reception control function, a display control function, an audio control function, an external input control function, a power control function, or a function of controlling power of an external device connected in a wireless manner (e.g., Bluetooth), The controller 210 may perform each function by using the software stored in the storage 290.

The image display apparatus having the display 220 may be electrically connected to a separate external device having a tuner. For example, it will be easily understood by those of ordinary skill in the art that the image display apparatus may be implemented by an analog TV, a digital TV, a 3D TV, a smart TV, an LED TV, an OLED TV, a plasma TV, a monitor, or the like but is not limited thereto.

The block diagrams of the image display apparatuses shown in FIGS. 2 and 3 are only illustrative and are not provided by way of a limitation. Each component in the block diagrams may be integrated, added, or omitted according to the actually implemented specifications of the image display apparatuses. That is, according to various scenarios, two or more components may be integrated into one component, or one component may be separated into two or more components. In addition, the functions performed in each block are to describe exemplary embodiments, and detailed operations or devices thereof do not limit the scope of the present disclosure.

Figure 4:
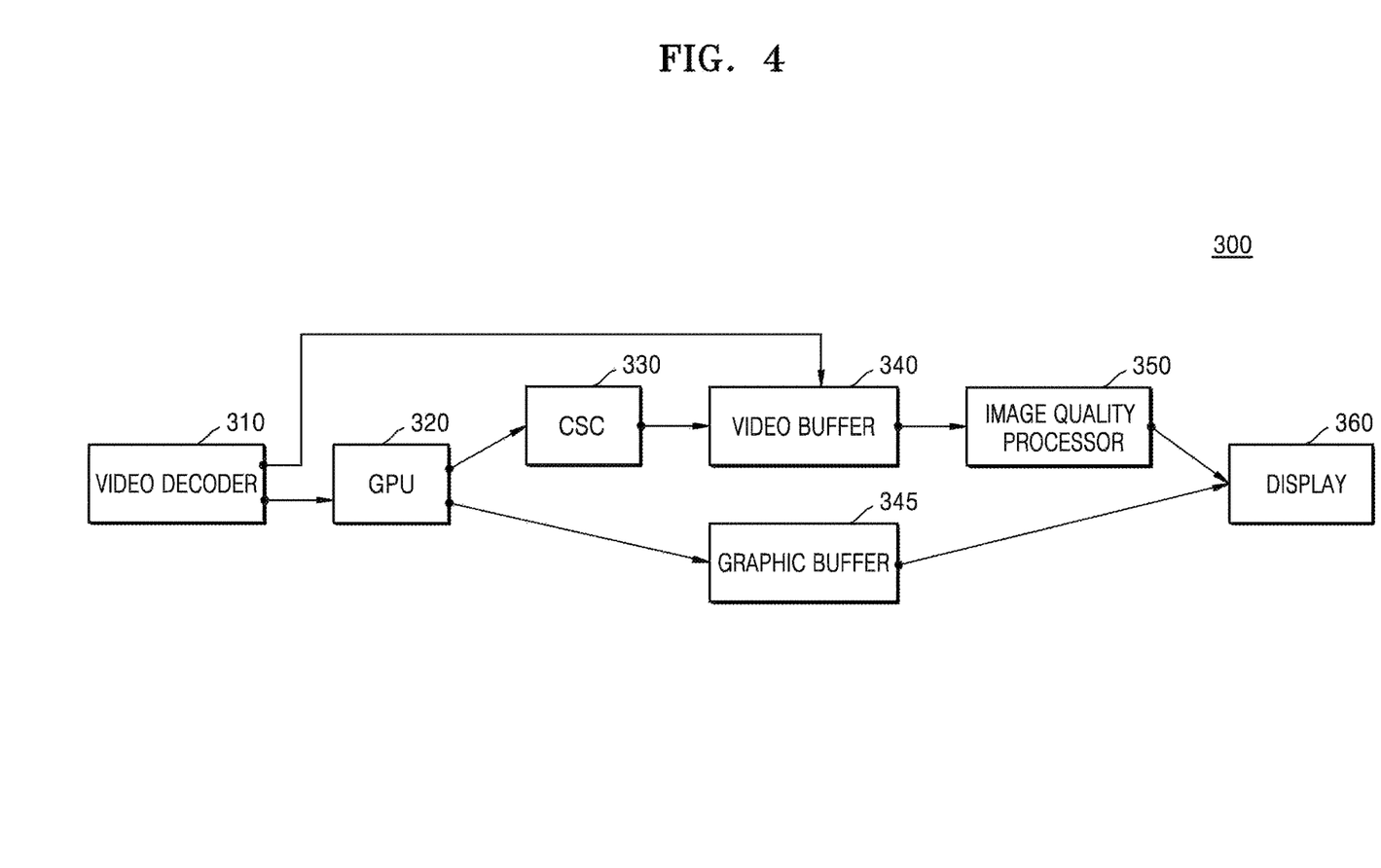
FIGS. 4 and 5 are flow diagrams illustrating a method of processing and displaying a 360° image, according to an exemplary embodiment.
Figure 5:
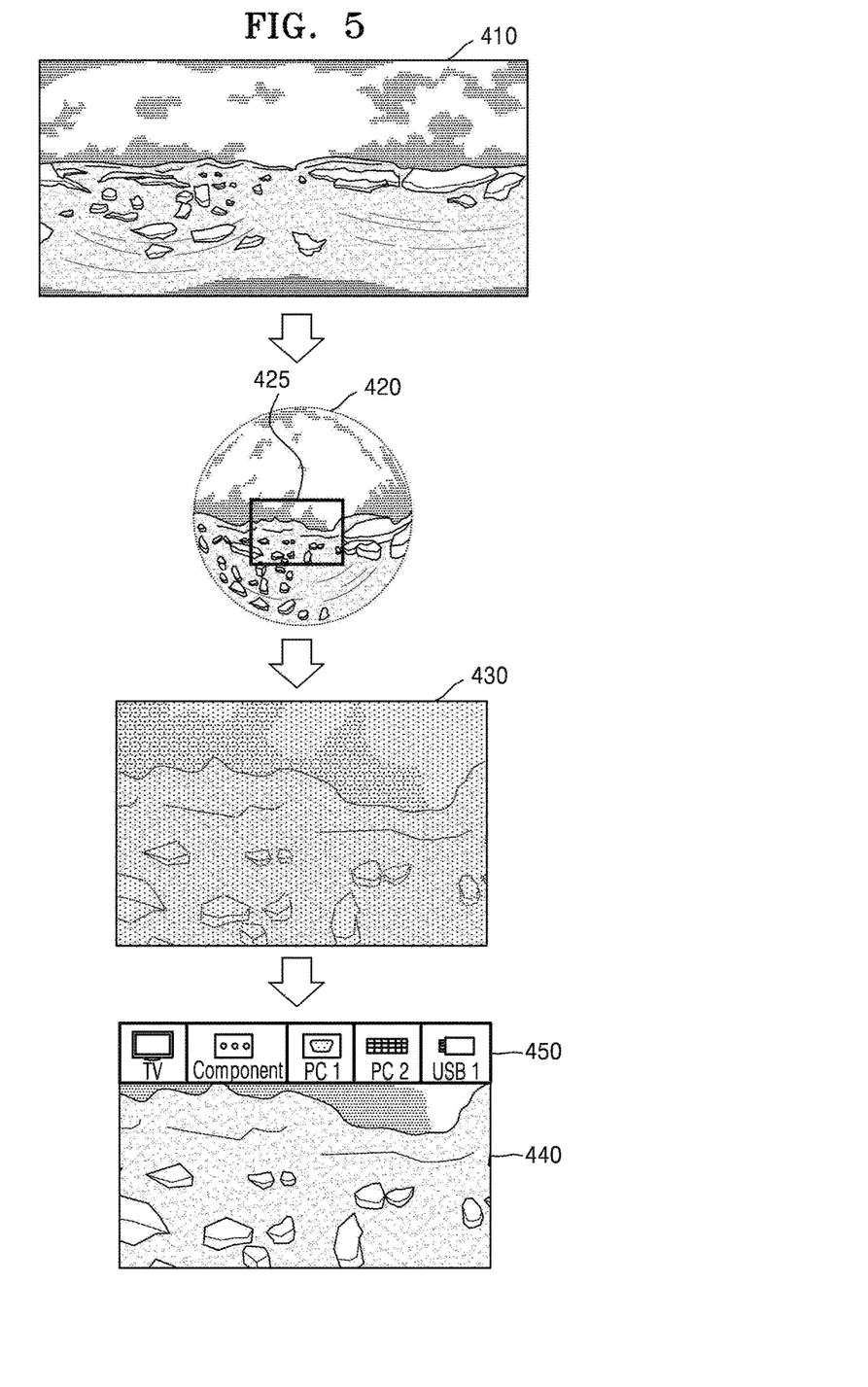

FIGS. 4 and 5 are flow diagrams illustrating a method of processing and displaying a 360° image, according to an exemplary embodiment.

Referring to FIG. 4, the image display apparatus 300 may include a video decoder 310, a GPU 320, a color space converter (CSC) 330, a video buffer 340, a graphics buffer 345, an image quality processor 350, and a display 360, and the image display apparatus 300 of FIG. 4 may be an exemplary embodiment of the image display apparatus 100 of FIG. 1.

The video decoder 310 may decode an image received from an external device or stored in the image display apparatus 300. For example, the video decoder 310 may decode a general image or a 360° image. The general image indicates an image other than a 360° image. The decoded general image may be represented by a YUV color space. In addition, the decoded 360° image may be a planar-format 360° image 410 as shown in an upper part of FIG. 5 and may be represented by a YUV color space, according to an exemplary embodiment.

The general image decoded by the video decoder 310 may not be input to the GPU 320 but may be stored in the video buffer 340. However, although FIG. 4 shows that a video buffer in which a general image is stored is the same as a video buffer in which a graphics-processed 360° image is stored, exemplary embodiments are not limited thereto and this is provided by way of an example only. According to an exemplary embodiment, the video buffer in which a general image is stored and the video buffer in which a graphics-processed 360° image is stored may be configured separately. The general image stored in the video buffer 340 may be image-quality-processed and is then displayed on the display 360. However, the decoded 360° image is input to the GPU 320.

The GPU 320 may map the planar-format 360° image 410 to a sphere to generate a sphere-format 360° image 420, as shown in the middle portion of FIG. 5. According to an exemplary embodiment, the sphere-format 360° image 420 may be represented by an RGB color space. In addition, the GPU 320 may extract a partial region 425 of the sphere-format 360° image 420, correct distortion of the partial region 425, and convert the distortion-corrected image into an image 430 having a rectangular view, as shown in the lower portion of FIG. 5. According to an exemplary embodiment, the partial region 425 may be selected based on an operating input (e.g., angle movement or zoom input) on the sphere-format 360° image 420.

According to an exemplary embodiment, the image display apparatus 300 may convert the color space of the image 430 of the partial region 425, which is output from the GPU 320, from the RGB color space into a YUV color space. For example, the color space of the image 430 of the partial region 425 may be converted from the RGB color space into the YUV color space by using the CSC 330. However, exemplary embodiments are not limited thereto.

The image display apparatus 300 may store the color-space-converted 360° image in the video buffer 340. The 360° image stored in the video buffer 340 may be represented by the YUV color space.

The image display apparatus 300 may perform image quality processing on the 360° image 430 stored in the video buffer 340. For example, the image display apparatus 300 may control the 360° image 430 stored in the video buffer 340 so as to be input to the image quality processor 350. Alternatively, an output of the video buffer 340 may be connected to an input of the image quality processor 350, according to an exemplary embodiment.

The image quality processor 350 may perform image quality processing on an input image. For example, the image quality processor 350 may optimize a cubic effect and a color sense of an image by improving a contrast ratio and color of the input image. Alternatively, the image quality processor 350 may optimize image quality by performing gamma correction on the input image. In addition, the image quality processor 350 may enhance sharpness of the image by performing sharpness processing on an edge portion included in the image. In addition, the image quality processor 350 may alleviate a jagging phenomenon appearing in the image by adjusting the resolution of the image or performing anti-aliasing, according to an exemplary embodiment.

According to an exemplary embodiment, the display 360 may display an image-quality-processed image 440, as shown in the lower portion of FIG. 5.

In addition, according to an exemplary embodiment, the GPU 320 may generate an OSD image. For example, the GPU 320 may receive an OSD signal of content from the outside or receive an OSD signal of content stored in a storage. Alternatively, the GPU 320 may generate an OSD signal according to a user input or by itself. The GPU 320 may generate an OSD image based on the OSD signal received or generated by itself (the GPU 320 generates the OSD image by processing the OSD signal received or generated by itself, and a graphic source is not shown as a separate component). The OSD image is a screen image which includes various objects, such as an icon, an image, and a text, for various kinds of information and may include, for example, a UI screen image, various menu screen images, and a widget screen image. However, exemplary embodiments are not limited thereto and are provided by way of an example only.

The image display apparatus 300 may store the OSD image output from the GPU 320 in the graphics buffer 345. Unlike the 360° image, the OSD image stored in the graphics buffer 345 may be displayed on the display 360 without image quality processing thereon.

For example, as shown in the lower portion of FIG. 5, an OSD image 450 output from the graphics buffer 345 may be displayed on the display 360 together with the image-quality-processed image 440.

When image quality processing is performed on an image obtained by synthesizing the 360° image and the OSD image, a breaking phenomenon may occur in a boundary between the 360° image and the OSD image, or an original color of the OSD image may be damaged. Accordingly, in an exemplary embodiment, the image display apparatus 300 may store the 360° image and the OSD image processed by the GPU 320 in separate buffers and perform image quality processing only on the 360° image.

Figure 6:
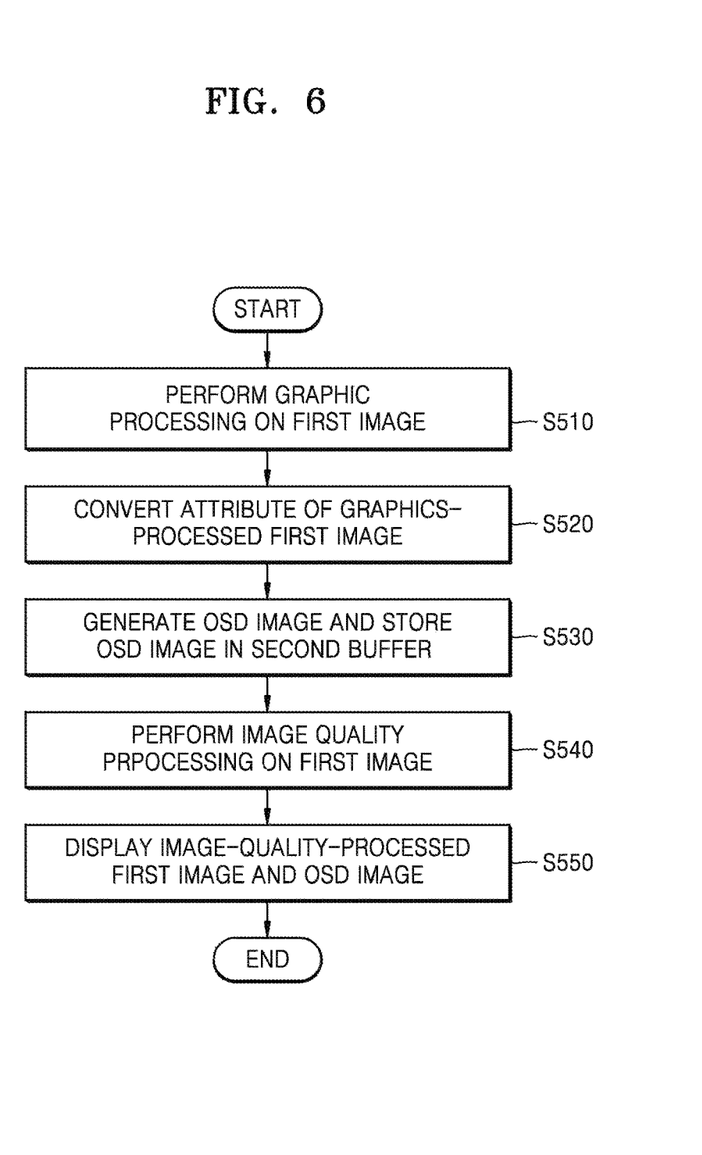
FIG. 6 is a flowchart illustrating a method of operating an image display apparatus, according to an exemplary embodiment.

FIG. 6 is a flowchart illustrating a method of operating the image display apparatus, according to an exemplary embodiment.

Referring to FIG. 6, the image display apparatus 100 may perform graphics processing on a first image, in operation S510.

For example, the first image may be an 360° image and the image display apparatus 100 may map a decoded planar-format 360° image to a sphere to generate a sphere-format 360° image. According to an exemplary embodiment, the generated sphere-format 360° image may be represented by an RGB color space. In addition, the image display apparatus 100 may extract a partial region of the sphere-format 360° image, correct distortion of the partial region, and convert the distortion-corrected image into an image having a rectangular view.

The image display apparatus 100 may convert an attribute of the graphics-processed first image, in operation S520. For example, the image display apparatus 100 may convert a color space of the graphics-processed 360° image from the RGB color space to a YUV color space and store the 360° image of the YUV color space in the first buffer. According to an exemplary embodiment, the first buffer may be a video buffer.

The image display apparatus 100 may generate an OSD image and store the OSD image in the second buffer, in operation S530.

Herein, the OSD image is a screen image including various objects, such as an icon, an image, and a text, for various kinds of information and may include, for example, a UI screen image, various menu screen images, and a widget screen image. However, exemplary embodiments are not limited thereto and are provided by way of an example only. The generated OSD image is stored in the second buffer, and the second buffer may be a graphics buffer.

The image display apparatus 100 may perform image quality processing on the first image of which the attribute is converted stored in the first buffer, in operation S540, according to an exemplary embodiment.

For example, the first image may be an 360° image, and the image display apparatus 100 may optimize a cubic effect and a color sense of an image by improving a contrast ratio and color of the 360° image. Alternatively, the image display apparatus 100 may optimize image quality by performing gamma correction on the 360° image. In addition, the image display apparatus 100 may enhance sharpness of the image by performing sharpness processing on an edge portion included in the 360° image. In addition, the image display apparatus 100 may alleviate a jagging phenomenon appearing in the image by adjusting resolution of the 360° image or performing anti-aliasing, according to various exemplary embodiments.

The image display apparatus 100 may display the image-quality-processed first image and the OSD image for which the image quality processing has not be performed, in operation S550.

The operating method of an image display apparatus, according to an exemplary embodiment, may be implemented as computer instructions which may be executed by various computer means, and recorded on a non-transitory computer-readable recording medium. The non-transitory computer-readable recording medium may include program commands, data files, data structures, or a combination thereof. The program commands recorded on the non-transitory computer-readable recording medium may be specially designed and constructed for the inventive concept or may be known to and usable by one of ordinary skill in a field of computer software. Examples of the non-transitory computer-readable medium include magnetic media such as hard discs, floppy discs, or magnetic tapes, optical media such as compact disc-read only memories (CD-ROMs), or digital versatile discs (DVDs), magneto-optical media such as floptical discs, and hardware devices that are specially configured to store and carry out program commands, such as ROMs, RAMs, or flash memories. Examples of the program commands include a high-level language code that may be executed by a computer using an interpreter as well as a machine language code made by a complier.

According to an exemplary embodiment, image quality processing may be performed on a graphics-processed 360° image, and thus an image-quality-improved image may be provided.

According to an exemplary embodiment, a graphics-processed 360° image and an OSD image may be stored in separate buffers, and thus image quality processing need not be performed on the OSD image and may be performed only on the 360° image.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents. Therefore, the scope of the present disclosure is defined not by the detailed description of exemplary embodiments but by the appended claims and their equivalents, and all differences within the scope will be construed as being included in the present disclosure.

What is claimed is:

1. An image display apparatus comprising:
a display;
a processor;
a memory; and
at least one program stored in the memory and executed by the processor,
wherein the at least one program comprises instructions which when executed by the processor cause the image display apparatus to:
obtain a general image by decoding a first video content,
store the general image in a first buffer, the first buffer being for storing a video image,
obtain a planar-format image by decoding a second video content, wherein the general image and the planar-format image are represented by a first color space,
perform graphic processing on the planar-format image to obtain a sphere-format image corresponding to the planar-format image, the sphere-format image represented by a second color space,
select a partial sphere-format image among the sphere-format image based on a user input on the sphere-format image,
perform graphic processing on the partial sphere-format image to obtain a partial planar-format image,
change a color space of the partial planar-format image from the second color space to the first color space, for performing image quality processing on the partial planar-format image,
store the partial planar-format image of which color space is changed from the second color space to the first color space in the first buffer,
generate an on screen display (OSD) image,
store the OSD image in a second buffer, the second buffer being for storing a graphic image,
perform the image quality processing on the partial planar-format image of which the color space is changed from the second color space to the first color space and which is stored in the first buffer, and
control the display to display the image-quality-processed partial planar-format image with the OSD image,
wherein the processor is configured to store the general image in the first buffer without performing of the graphic processing and the change of the color space on the general image, and
wherein the first buffer storing the partial planar-format image and the general image is configured separately from the second buffer storing the OSD image.

2. The image display apparatus of claim 1, wherein the first color space is a YUV color space and the second color space is an RGB color space.

3. The image display apparatus of claim 1, further comprising a color space converter (CSC), implemented by the processor, configured to change the color space of the partial planar-format image from an RGB color space to a YUV color space.

4. The image display apparatus of claim 1, further comprising an image quality processor, connected to the first buffer, configured to perform the image quality processing on the planar-format partial image received from the first buffer and output the image-quality-processed planar-format partial image.

5. The image display apparatus of claim 1, wherein the image quality processing comprises at least one of contrast ratio and color improvement, gamma correction, sharpness enhancement, and jagging phenomenon alleviation processing.

6. The image display apparatus of claim 1, further comprising a video decoder configured to decode the second video content to obtain the planar-format image.

7. The image display apparatus of claim 1,
wherein the processor is further configured to:
map the planar-format image to the sphere-format image.

8. The image display apparatus of claim 7,
wherein the processor is further configured to receive the user input for selecting the partial sphere-format image from the sphere-format image and extract the partial sphere-format image from the sphere-format image based on the user input.

9. The image display apparatus of claim 1,
wherein the image quality processing on the partial planar-format image optimizes a cubic effect and a color sense of the partial planar-format image and enhances sharpness of the partial planar-format image by performing sharpness processing on edge portions of the partial planar-format.

10. The image display apparatus of claim 1, wherein the processor is further configured to perform graphic processing on the partial sphere-format image by correcting distortion of the partial sphere-format image.

11. The image display apparatus of claim 1, wherein the second video content corresponds to 360-degree video.

12. A method of displaying an image, the method comprising:
obtaining a general image by decoding a first video content;
storing the general image in a first buffer, the first buffer being for storing a video image;
obtaining a planar-format image by decoding a second video content, wherein the general image and the planar-format image are represented by a first color space;
performing, by a processor, graphic processing on the planar-format image to obtain a sphere-format image corresponding to the planar-format image, the sphere-format image represented by a second color space;
selecting a partial sphere-format image among the sphere-format image based on a user input on the sphere-format image;
performing graphic processing on the partial sphere-format image to obtain a partial planar-format image;
changing a color space of the partial planar-format image from the second color space to the first color space, for performing image quality processing on the partial planar-format image;
storing the partial planar-format image of which color space is changed from the second color space to the first color space in the first buffer,
generating an on screen display (OSD) image;
storing the generated OSD image in a second buffer, the second buffer being for storing a graphic image;
performing the image quality processing on the partial planar-format image of which the color space is changed from the second color space to the first color space and which is stored in the first buffer; and
displaying the image-quality-processed partial planar-format image and the OSD image on a display,
wherein the general image is stored in the first buffer without the graphic processing and the change of the color space being performed on the general image, and
wherein the first buffer storing the partial planar-format image and the general image is configured separately from the second buffer storing the OSD image.

13. The method of claim 12, wherein the first color space is a YUV color space and the second color space is an RGB color space.

14. The method of claim 12, wherein the performing the image quality processing on the partial planar-format image comprises performing at least one of contrast ratio and color improvement, gamma correction, sharpness enhancement, and jagging phenomenon alleviation processing.

15. The method of claim 12, wherein the performing graphics processing on the planar-format image comprises:
mapping the planar-format image to the sphere-format image.

16. The method of claim 15, further comprising:
receiving an input for selecting the partial image of the sphere-format image, and
wherein the obtaining the partial sphere-format image comprises extracting the partial sphere-format image from the sphere-format image based on the user input.

17. The method of claim 12,
wherein the image quality processing is not performed on the OSD image.

18. The method of claim 12, wherein the image quality processing on the partial planar-format image optimizes a cubic effect and a color sense of the partial planar-format image and enhances sharpness of the partial planar-format image by performing sharpness processing on edge portions of the partial planar-format image.

19. The method of claim 12, wherein the performing graphic processing on the partial sphere-format image comprises correcting distortion of the partial sphere-format image.

20. The method of claim 12, wherein the second video content corresponds to 360-degree video.

21. A non-transitory computer-readable recording medium having recorded thereon program instructions, which when executed by a computer, perform the method of claim 12.

* * * * *